United States Patent [19]

Mather et al.

[11] Patent Number: 4,714,268

[45] Date of Patent: Dec. 22, 1987

[54] FOLDING GOLF CART

[75] Inventors: Graham W. Mather; Graham R. Warwick, both of Coventry; Graham A. Bazeley, Bedworth, all of England

[73] Assignee: Fisherwell Limited, England

[21] Appl. No.: 29,047

[22] Filed: Mar. 23, 1987

Related U.S. Application Data

[63] Continuation of Ser. No. 833,117, Feb. 26, 1986, abandoned.

[30] Foreign Application Priority Data

Feb. 26, 1985 [GB] United Kingdom ............... 8504925

[51] Int. Cl.⁴ ............................................. B62D 3/04
[52] U.S. Cl. ..................................... 280/646; 248/96
[58] Field of Search ...................... 248/96, 98; 280/38, 280/40, 645, 646, 651, 652, 655, DIG. 6

[56] References Cited

U.S. PATENT DOCUMENTS

| | | | |
|---|---|---|---|
| 2,598,046 | 5/1952 | Frey | 280/38 |
| 2,647,762 | 8/1953 | Jamieson et al. | 280/DIG. 6 X |
| 2,679,402 | 5/1954 | Sawyer et al. | 280/646 |
| 2,791,436 | 5/1957 | Wuerthner | 280/38 |
| 2,806,709 | 9/1957 | Watson | 280/38 |
| 3,459,434 | 8/1969 | Dulaney | 280/38 |
| 4,289,326 | 9/1981 | Hawkes | 280/DIG. 6 X |

FOREIGN PATENT DOCUMENTS

| | | |
|---|---|---|
| 800918 | 9/1958 | United Kingdom . |
| 1025705 | 4/1966 | United Kingdom . |
| 1069422 | 5/1967 | United Kingdom . |
| 1172525 | 12/1969 | United Kingdom . |
| 1570275 | 6/1980 | United Kingdom . |
| 2104009A | 7/1982 | United Kingdom . |

*Primary Examiner*—John J. Love
*Assistant Examiner*—Michael Mar
*Attorney, Agent, or Firm*—Banner, Birch, McKie & Beckett

[57] ABSTRACT

A folding golf cart which comprises a stem, a golf bag support mechanism, a handle member, wheel support arms, wheels and a folding mechanism. The stem is hollow and extends centrally and longitudinally. The golf bag support mechanism is connected to the stem for supporting a golf bag on the cart. The handle member is telescopically carried in the stem and has a first end projecting beyond a first end of the stem and a second opposite end projecting beyond a second opposite end of the stem. The first end of the handle member has a handle to be grasped and the second end of the handle member has a mounting mechanism. The wheel support arms pivotally extend on opposite sides of the stem for motion between a laterally-extending support position and a folded position adjacent the stem. A wheel is rotatably supported by each support arm. The folding mechanism moves the support arms between the support and folded positions, and is coupled between each support arm and the mounting mechanism.

5 Claims, 2 Drawing Figures

FOLDING GOLF CART

This application is a continuation of application Ser. No. 833,117, filed Feb. 26, 1986, now abandoned.

TECHNICAL FIELD

This invention relates to carts or trolleys, in particular to carts or trolleys suitable for use in the game of golf.

BACKGROUND OF THE INVENTION

Golf carts conventionally include a pair of relatively large widely-spaced wheels. Frequently, the golf carts must be transported to and from golf courses in cars. In order to reduce the overall dimensions of the golf cart for transportation purposes it has been proposed to fold up portions of the golf cart. SUMMARY OF THE INVENTION An object of the invention is to provide an improved folding cart suitable for use as a golf cart.

According to the invention a folding golf cart comprises a stem, a golf bag support mechanism, a handle member, wheel support arms, wheels and a folding mechanism. The stem is hollow and extends centrally and longitudinally. The golf bag support mechanism is connected to the stem for supporting a golf bag on the cart. The handle member is telescopically carried in the stem and has a first end projecting beyond a first end of the stem and a second opposite end projecting beyond a second opposite end of the stem. The first end of the handle member has a handle to be grasped and the second end of the handle member has a mounting mechanism. The wheel support arms pivotally extend on opposite sides of the stem for motion between a laterally-extending support position and a folded position adjacent the stem. A wheel is rotatably supported by each support arm. The folding mechanism moves the support arms between the support and folded positions. The folding mechanism is coupled between each support arm and the mounting mechanism in such a manner that telescopic movement of the handle member along the length of the stem moves the support arms between the support position wherein the wheels are laterally spaced from one another to stably support the cart and the folded position wherein the wheels are adjacent the stem to reduce the size of the cart for transportation.

Preferably the support arms are mounted on the stem through a support member fixed to the stem and extending transversely of, and to each side of, the stem. A support arm is pivotally secured adjacent the outer end of each support member.

The folding mechanism is conveniently in the form of rods. One end of each rod is pivotally secured to a support arm at a position spaced from the support arm's pivot. The other end of each rod is connected to the mounting mechanism of the handle member.

It will be seen that, as the handle member is moved telescopically relative to the stem, the handle member is, at one end, retracted into the stem and at the other end the member projects through the stem to cause the rods to pivot the arms towards a folded, transportation position. In this position the wheel support arms, with wheels at the outer ends of the arms, move towards the lower end of the stem thereby reducing the overall width of the gold cart.

Preferably the stem is of circular or rectangular hollow section with the handle member of similar external profile to be a sliding fit in the stem. A fixing member may operate between the upper end of the stem and the handle member to fix the handle member relative to the stem in the operative position or in the transport position.

Further features of the invention will appear from the following description of an embodiment of the invention given by way of example only and with reference to the drawings.

DETAILED DESCRIPTION OF THE INVENTION

Figure 1:
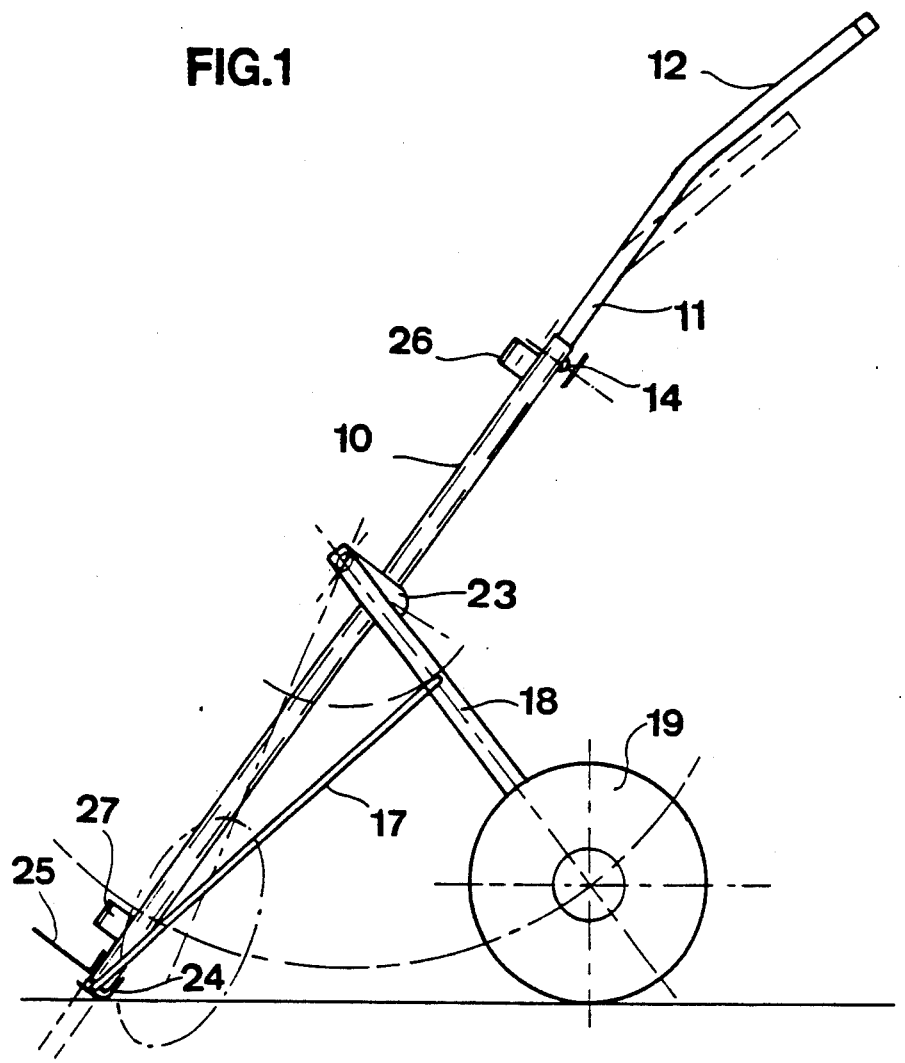
FIG. 1 is a side elevation of a golf cart according to the invention.

Referring to the drawings a golf cart or trolley 1 is shown suitable for use in transporting a golf bag (not shown) of conventional form during the game of golf.

Cart 1 includes a central, longitudinal hollow stem 10 of circular or square cross-section. A handle member 11 has a sliding telescopic fit within stem 10. A first upper end of handle member 11 extends from a first, upper end of stem 10 and is formed with a handle 12 having a transversely-extending handlegrip 13. If desired, handle 12 may be adjustable relative to handle member 11 to adjust the height of handle 12.

Figure 2:
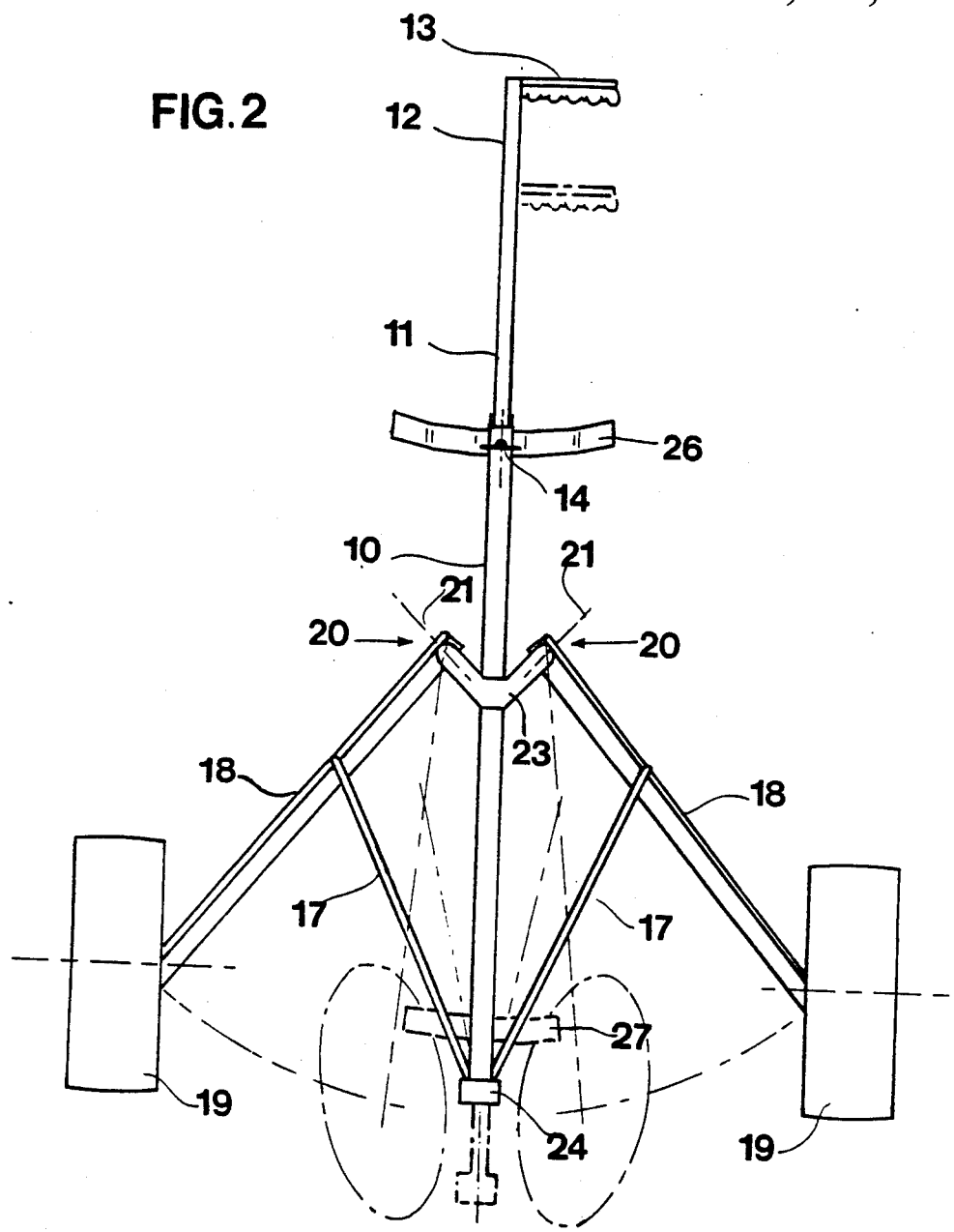
FIG. 2 is a front elevation of the golf cart.

A fixing device 14, such as the illustrated threaded screw with rotatable knob, is carried on stem 10 and rotation of the knob fixes handle member 11 in a selected position relative to stem 10. As shown in full lines in FIGS. 1 and 2 cart 1 is in an operative position with handle member 11 fully extended from the upper end of stem 10. The chain lines show cart 1 in the folded transport position in which handle member 11 is retracted into stem 10.

Handle member 11 extends through stem 10 from one end to the other either as an integral unit or by the attachment of a rod or other portion (not shown) to the lower end of handle member 11. The lower end of handle member 11 protrudes from the lower end of stem 10 and carries a mounting mechanism 24 which also acts as a support for a pair of rods 17 and as a stop member to prevent upward movement of handle member 11 beyond the full line position by having a dimension larger than an aligned cross-sectional dimension of stem 10 at its lower end.

Rods 17 are each pivotally supported by the mounting mechanism 24 at one end, and the other ends of the rods 17 are each pivotally mounted on wheel support arms 18. Support arms 18 each rotatably carry at their outer end a ground-engaging wheel 19 which may be removable from the associated arm 18 for transport. The inner ends of arms 18 are pivotally mounted at 20 about axes 21. When handle member 11 is moved downwardly along the stem, rods 17 function as a folding mechanism and move with the lower end of handle member 11, so that rods 17 and arms 18 pivot towards the illustrated chain line position. It will be seen that in the chain line, folded position wheels 19 lie adjacent the lower end of stem 10.

In the folded position the overall width of cart 1 is considerably reduced and, due to the geometry of the wheel support arrangement, the overall depth of cart 1 is also reduced due to a tilting action of wheels 19 during folding. The overall size of cart 1 in order to facilitate its transportation is thus reduced.

Support arms 18 are carried on a transverse cross-member 23 mounted on stem 10 intermediate its ends. Cross-member 23 is generally V-shaped and is welded or otherwise secured to the stem towards the center of cross-member 23, with the limbs of the V extending outwardly and upwardly for attachment at their ends to arms 18.

Handle member 11 carries a ground engaging plate at its lower end. The ground engaging plate can be formed as a part of, or connected to, the mounting mechanism 24. Stem 11 carries an L-shaped golf bag support plate 25 for the lower end of the golf bag, and, at the upper and lower ends of stem 10, plates 26 and 27 are provided for supporting the underside of the golf bag during use of cart 1. Plates 26 and 27 may also be used to carry resilient elements for retaining the golf bag on cart 1.

The cart described provides a simple construction which, by one simple movement of the handle member, may be converted from its operative position with the wheels widely spaced where the cart is stably supported to a transport position in which a compact arrangement is achieved.

The invention is described in detail in connection with the preferred embodiment, but also is an example only and this invention is not restricted thereto. It will be easily understood by those skilled in the art that other variations and modifications can be easily made within the scope of this invention.

We claim:

1. A folding golf cart having an open support position and a folded position comprising:
   a single frame member having a central longitudinally extending hollow stem;
   golf bag support means connected to said stem for supporting a golf bag on the cart;
   a handle member telescopically carried in said stem, an upper end of said handle member projecting upwards beyond a first end of said stem and having a handle to be grasped, a second opposite end of said handle member projecting downwards beyond a lower opposite end of said stem and having a mounting mechanism, said mounting mechanism being engageable with the ground for supporting the cart when the cart is in said support position;
   wheel support arms pivotally connected with respect to said stem and extending on opposite sides of said stem for motion between a laterally extending support position and a folded position adjacent said stem;
   a wheel rotatably supported by each of said support arms; and
   folding means for moving said support arms between said support and folded positions, said folding means being coupled between each of said support arms and said mounting mechanism so that telescopic movement of said handle member along the length of said stem moves said support arms between the support position wherein said wheels are laterally spaced from one another with said mounting mechanism being in engagement with the lower end of said stem for supporting the cart in a stable manner and the folded position wherein said wheels are adjacent said stem to reduce the size of the cart for transportation.

2. A folding golf cart in accordance with claim 1 wherein a transverse support member extends transversely from each of said opposite sides of said stem, and one of said wheel support arms being pivotally connected on each side of support members at a location spaced from said stem.

3. A folding golf cart in accordance with claim 2 wherein said transverse support member is fixed to said stem intermediate its length and includes an outwardly and upwardly extending limb on each of said opposite sides of said stem, and one of said wheel support arms being pivotally connected to each of said limbs.

4. A folding golf cart in accordance with claim 2 wherein said folding means includes a pair of rods, each rod being pivotally connected at one of its ends to one of said support arms at a location spaced from the pivotal connection of said support arm to said support member and closer to said pivotal connection of the support arms than to said wheels, each rod being connected at its other end to said mounting member.

5. A folding golf cart in accordance with claim 1 wherein said mounting mechanism has a dimension greater than an aligned cross-sectional dimension of said stem at its second end to stop upward telescopic motion of said handle member.

* * * * *